(12) United States Patent
van Walraven (10) Patent No.: US 7,611,101 B2
(45) Date of Patent: Nov. 3, 2009

(54) VIBRATION ISOLATING PIPE CLIP (75) Inventor: Jan van Walraven, GP Mijdrecht (NL)

(73) Assignee: J. Van Walraven B.V., RK Mijdrecht (NL)

( * ) Notice: Subject to any disclaimer, the term of this patent is extended or adjusted under 35 U.S.C. 154(b) by 206 days.

(21) Appl. No.: 10/523,926

(22) PCT Filed: Aug. 4, 2003

(86) PCT No.: PCT/NL03/00559
§ 371 (c)(1),
(2), (4) Date: Feb. 7, 2005

(87) PCT Pub. No.: WO2004/013534
PCT Pub. Date: Feb. 12, 2004

(65) Prior Publication Data
US 2005/0230568 A1  Oct. 20, 2005

(30) Foreign Application Priority Data
Aug. 6, 2002 (NL) .................................. 1021220

(51) Int. Cl.
F16L 3/08 (2006.01)
(52) U.S. Cl. ............... 248/74.4; 248/74.1; 248/74.2; 248/74.3; 248/58; 248/62; 248/68.1
(58) Field of Classification Search ............... 248/74.3, 248/58, 62, 68.1, 74.1, 74.2, 74.4
See application file for complete search history.

(56) References Cited
U.S. PATENT DOCUMENTS 592,755 A    11/1897 Comte de Sparre
3,342,911 A * 9/1967 Funahashi .................. 264/46.5
4,942,187 A * 7/1990 Kawata et al. ............... 523/200
5,384,936 A * 1/1995 Van Walraven ............... 24/279
5,947,425 A * 9/1999 Gerster ......................... 248/58

FOREIGN PATENT DOCUMENTS

| DE | 19926952 C1 |   | 2/2001 |
| EP | 0387966 A1 | * | 9/1990 |
| EP | 0 413 883 A1 |  | 2/1991 |
| EP | 1 106 900 A1 |  | 6/2001 |
| EP | 1106900 A1 | * | 6/2001 |
| FR | 2 514 293 A |  | 4/1983 |
| GB | 592755 |  | 9/1947 |

* cited by examiner

Primary Examiner—J. Allen Shriver, II
Assistant Examiner—Nkeisha J Smith
(74) Attorney, Agent, or Firm—Browdy and Neimark, P.L.L.C.

(57) ABSTRACT

A vibration isolation pipe clip for securing a pipe to a support, in particular for securing a medium-carrying pipe to a wall or ceiling of a building.

The pipe clip has a substantially annular, rigid pipe clip body which is composed of one or more parts and is provided with a securing element for securing the pipe clip body to a support.

A substantially annular vibration isolating member is provided, this vibration isolating member bearing against the inner circumference of the pipe clip body and ultimately being positioned between the outer circumference of the pipe and the pipe clip body.

The vibration isolating member is made from a porous elastomer material, preferably vulcanized porous rubber with closed cavities and separating walls between them.

10 Claims, 6 Drawing Sheets

| 1/3 octave band center frequency [Hz] | $D_e$ [dB] |
| --- | --- |
| 100 | -7,3 |
| 125 | 13,5 |
| 160 | 1,5 |
| 200 | 1,4 |
| 250 | 13,6 |
| 315 | 12,7 |
| 400 | 9,3 |
| 500 | 14,3 |
| 630 | 27,0 |
| 800 | 22,9 |
| 1000 | 20,5 |
| 1250 | 24,2 |
| 1600 | 20,4 |
| 2000 | 22,7 |
| 2500 | 17,7 |
| 3150 | 18,2 |
| 4000 | 20,7 |
| 5000 | 27,9 |
| REDUCTION IN NOISE LEVEL | 17,9 |

| 1/3 octave band center frequency [Hz] | $D_e$ [dB] |
|---|---|
| 100 | -2,2 |
| 125 | 11,8 |
| 160 | 12,2 |
| 200 | 18,3 |
| 250 | 28,3 |
| 315 | 27,8 |
| 400 | 25,2 |
| 500 | 20,6 |
| 630 | 25,1 |
| 800 | 24,5 |
| 1000 | 28,7 |
| 1250 | 37,0 |
| 1600 | 32,5 |
| 2000 | 29,0 |
| 2500 | 24,2 |
| 3150 | 26,1 |
| 4000 | 26,3 |
| 5000 | 33,1 |
| REDUCTION IN NOISE LEVEL | 26,7 |

VIBRATION ISOLATING PIPE CLIP

BACKGROUND OF THE INVENTION

The invention relates to a vibration isolating pipe clip for the vibration isolating securing of a pipe to a support, in particular a wall or ceiling of a building.

The invention relates in particular to the vibration isolating member of a pipe clip of this type, which vibration isolating member is located between the pipe and the pipe clip body. The vibration isolating member is intended to reduce the transmission of vibrations from the pipe to the pipe clip body and then to the support.

PRIOR ART

U.S. Pat. No. 592,755 describes a large number of different vibration isolating members for a pipe clip. U.S. Pat. No. 592,755 proposes that the vibration isolating member be designed in such a manner that one or more internal passages extending in the circumferential direction are present in the vibration isolating member. In addition to the solution of providing internal passages, it is also known to arrange grooves and fins at the inner circumference and/or outer circumference of the vibration isolating members, as revealed, for example, by EP 0 413 883.

The provision of internal passages and the provision of grooves and fins are generally known measures in the field of vibration isolating members for pipe clips.

Vibration isolating pipe clips with a vibration isolating member which is made from a foamed rubber with a structure of open and/or closed cells and intervening cell walls of film thickness are also known. A drawback of these known pipe clips is that the cell walls of film thickness are only able to withstand a very low repeated load and buckle in the event of this load being exceeded meaning that they have then permanently collapsed. Even an excessive static load may cause the cell walls to rupture. This means that foam rubbers are in the long term insufficiently stable for this application, and moreover such materials are undesirably sensitive to temperature. In practice, pipe clips with a foam rubber vibration isolating member are only suitable for relatively undemanding applications under light loads.

The abovementioned vibration isolating members are used in pipe clips with a vibration isolating effect. This effect is important, for example, in the case of medium-carrying lines, such as water pipes, central heating pipes and the like in buildings, in which context the transmission of vibrations from these lines to the walls and ceilings to which the lines are secured using the pipe clip constitutes a problem.

To ensure the intended vibration isolating action, it is known for the producer of the pipe clip to specify for any pipe clip a maximum permissible working load which can be exerted on the vibration isolating member by the pipe in the radial direction while retaining the vibration isolating effect of the vibration isolating member. This maximum working load is a static load which is calculated on the basis of the weight of the filled pipe.

It is generally known, for example from DE 199 26 952, that if the vibration isolating member is compressed to a greater extent, the vibration isolating action decreases. In that context, it is already known that, in the case of a pipe clip with vibration isolating member, two different maximum working loads are given, namely a maximum working load which is such that the vibration isolating effect is retained and a much higher maximum working load at which there is no longer any vibration isolation. A producer is known where the latter value is higher by a factor of 5 than the former value It will be clear that such a great difference means that a very large number of pipe clips are required to support a pipe, leading to undesirably high levels of difficulty in installation.

Another drawback of a low maximum working load for retaining vibration isolation is that in practice there is a considerable risk of the vibration isolating member in fact being subject to heavier loads than the static working load calculated when designing the installation. This is because the actual load on the vibration isolating member is also determined by a number of other factors which are not generally taken into account in the calculation on paper. These factors include, inter alia, thermal effects, for example the expansion of the pipe, but above all what are known as assembly effects. These include, for example, the alignment of the pipe clip if, as is customary, a pipe is supported by a plurality of pipe clips arranged at a distance from one another. If one pipe clip is aligned slightly inaccurately with respect to the pipe, which in practice is almost inevitable, this will result in an additional load on the vibration isolating member. Also, in practice there is a considerable risk of the annular clip body of the pipe clip being tightened excessively around the pipe, in particular now that use is often made of powerful electric screwdrivers to tighten the bolt(s) of the pipe clip. (Excessive) tightening of the pipe clip also leads to an additional static load on the vibration isolating member. These effects cause the vibration isolating effect to decrease or be lost altogether. Hitherto, these effects have not been taken into account when assessing the vibration isolating effect of the pipe clips by means of laboratory-scale tests.

OBJECT AND SUMMARY OF THE INVENTION

It is an object of the invention to propose an improved pipe clip which—taking account of the real practical situation when pipes are installed, with the aid of pipe clips—provides the desired vibration isolation.

The invention provides a vibration isolating pipe clip for securing a pipe to a support, in particular for securing a medium-carrying pipe to a wall or ceiling of a building. The pipe clip comprises a rigid pipe clip body which is composed of one or more parts and is provided with securing means for securing the pipe clip body to a support. The pipe clip further comprises a vibration isolating member which bears against the inner circumference of the pipe clip body and is ultimately positioned between the outer circumference of the pipe and the pipe clip body. The vibration isolating member is made from porous vulcanized rubber with closed cavities and separating walls between them.

The invention provides a pipe clip according to the preamble of claim 1 which is characterized in that the vibration isolating member is made from a porous elastomer with closed cavities and separating walls between them.

It is preferable for the vibration isolating member to be made from a porous vulcanized rubber with closed cavities and separating walls between them.

By using porous vulcanized rubber instead of solid rubber or foamed rubber, as known from the prior art, it is possible to make optimum use of the advantageous properties of solid rubber—in particular with regard to the elastic deformability properties—while moreover obtaining the desired "soft behaviour" of the vibration isolating member as a result of the porosity.

The invention is based, inter alia, on the insight that the so-called "form factor" of a vibration isolating member is relevant to the vibration isolation which can be achieved. After all, vulcanized rubber is not compressible, meaning that compression in a specific direction is associated with the formation of a bulge in another direction.

In the case of pipe clips in which the rigid, substantially annular pipe clip body lies around the outside of the substantially annular vibration isolating member, in practice this bulge can only form in the lateral direction (in the direction of the axis of the pipe). The known shapes of the vibration isolating member with internal passages and/or external fins and grooves are intended to promote this mechanism of local compression under the influence of the pipe and lateral bulging and in this way to facilitate the compression of the vibration isolating member.

The form factor is the quotient of the surface area which is subject to load, on the one hand, and the free surface area of the vibration isolating member, on the other hand. In the case of a known vibration isolating member made of solid rubber and with a solid cross section, in the event of compression of the vibration isolating member between the pipe and the pipe clip body, only the free edges of the vibration isolating member can be considered as free surface area, meaning that the form factor is high.

The known vibration isolating members for pipe clips which are provided with internal passages extending over the circumference and/or grooves and fins over the circumference at the outer edges have a more favourable form factor than the solid vibration isolating members described above, on account of the larger free surface area.

On account of porous elastomer material, preferably porous vulcanized rubber, being used as material for the vibration isolating member for a pipe clip as proposed by the invention, it is possible to obtain a much larger free surface area than in the case of the known vibration isolating members for pipe clips, since the cavities make a considerable contribution to the free surface area. In this way, it is possible to obtain a significantly lower form factor than with the known vibration isolating members for pipe clips. As a result, it is possible to obtain a pipe clip with noticeably favourable isolating properties without the external dimensions of the vibration isolating member (and therefore of the pipe clip) having to be altered compared to the known pipe clips.

The free surface area of the porous material created by the cavities is also advantageous for the vibration isolating effect if the shear load of the vibration isolating member is taken into account, since a vibrating pipe also exerts dynamic forces on the vibration isolating member in the longitudinal direction of the pipe, leading to shearing of the said isolation member. Compared to solid rubber, the active surface which is subject to shear in the case of the vibration isolating member according to the invention is significantly smaller and therefore the vibration isolating member provides less shearing resistance. This too makes a considerable contribution to the isolating properties of the pipe clip according to the invention.

It is preferable for the form factor of the vibration isolating member to be less than 0.2, particularly preferably less than 0.1, the form factor being determined for the linear compression range under compression of the porous elastomer, preferably the porous vulcanized rubber.

It is preferable for the walls between the cavities to have a thickness and for the cavities to have a diameter which are such that elastic deformation of the vibration isolating member takes place under elastic deformation of these walls, with the volume of the cavities being reduced. In the event of compression of the porous rubber, therefore, it is observed that the walls are compressed in one direction and bulge out into the space of the cavities substantially at right angles to this direction.

It is preferable for the thickness of the walls to be such that in the event of elastic deformation of the vibration isolating member the intervening walls have a deformation behaviour which substantially corresponds to the deformation behaviour of solid material, as explained above. These walls between the cavities of the porous material have a thickness which is considerably greater than the film-thin walls which are known from foamed rubber and also behave significantly differently under load. This is because in the vibration isolating member according to the invention it is these walls which provide the elastic bearing force of the vibration isolating member. The material, preferably the vulcanized rubber, of the walls of this vibration isolating member is not itself compressible, but on account of the presence of cavities throughout the porous material, the walls can bulge under the influence of a load exerted thereon, the size of the cavities then being reduced. In the event of the vibration isolating member being compressed under the influence of the maximum permissible working load which may be exerted on the vibration isolating member by the pipe in the radial direction while maintaining the vibration isolating effect of the vibration isolating member, cavities will still be present in the material.

It is preferable for the cavities to be substantially unpressurized, such that in the event of a reduction in the volume of the cavities under the influence of deformation of the vibration isolating member, no significant increase in pressure occurs inside the cavities.

It is preferable for the thickness of the intervening walls to be greater than or equal to the diameter of the cavities.

It is advantageous for the diameter of the cavities to be between 0.03 and 0.7 millimeter, preferably between 0.05 and 0.5 millimeter.

It is preferable for the number of cavities per $mm^3$ to be between 75 and 350 cavities, particularly preferably between 100 and 275 cavities.

It is preferable for the porous material, particularly preferably the vulcanized porous rubber, to be selected from the group consisting of materials obtained by cleaving off water (if appropriate at a vulcanization temperature) from a water-containing chemical (examples of these materials include vulcanized rubbers).

It is preferable for the porous rubber to be selected from the group of EPDM polymers.

It is preferable for the water-containing chemical to be a hydrated salt.

It is preferable for the vibration isolating member to have an elongate strip-like body which extends along the inner circumference of the annular body. It is preferable for the strip-like body to be extruded.

In one possible embodiment, the body of the vibration isolating member is provided with retaining edges which interact in a positively locking manner with the pipe clip body. It is preferable for the retaining edges to extend along the side edges of the pipe clip body, for example for the retaining edges to engage around the pipe clip body.

The retaining edges preferably have a less porous structure than the intervening porous strip. It is particularly preferable for the retaining edges to have a solid structure.

It is preferable for the side edges to be formed integrally on the intervening porous strip in a co-extrusion process.

When compared to know pipe clips, the choice of materials according to the invention has been found to provide advantages in particular in the low-frequency range, in particular for vibrations below 250 Hz. This is important, for example, for pipe systems with an electrically driven pump with vanes. The passage frequency of the vanes then leads to a vibration in the pipe system in the range below 250 Hz. In this context, it is noted that low-frequency noise, even when it is not perceptible or scarcely perceptible to the human ear, is harmful to health.

It will be clear that the choice of materials according to the invention can be combined with known measures in the field of shaping.

It is preferable for the vibration isolating member to have a characteristic line which represents the relationship between a compressive load (N) exerted on the vibration isolating member and the resulting relative compression of the vibration isolating member (%), which characteristic line, as the compressive load increases, has a first zone with a substantially linear relationship between the compressive load and the relative compression, an adjoining second zone with a reduced increase in the relative compression as the compressive load continues to increase, and possibly a third zone with a relative compression which remains substantially constant as the compressive load continues to increase, the characteristic line of the vibration isolating member having a transition from the first zone to the second zone at a relative compression of the vibration isolating member which amounts to at least 50%.

The thickness of the known vibration isolating members, as well as of prefered embodiments according to the invention, is in the range between 3 and 10 millimeters. Tests have shown that in the case of the known vibration isolating members, which have a similar characteristic line, the transition from the first zone to the second zone is to be found at a relative compression of the vibration isolating member of approximately 25%. This means that in the event of a compression of approx. 1-2.5 millimeters, the vibration isolating effect has already been lost. This level of compression often occurs, for the reasons outlined above.

In the case of the pipe clip according to the invention, a much broader range is available for the compression of the vibration isolating member. The producer can now simply select the maximum permissible working load which may be exerted on the vibration isolating member by the pipe in the radial direction while maintaining the vibration isolating effect of the vibration isolating member to be such that there is sufficient margin left for further compression of the vibration isolating member as a result of assembly effects without the relative compression exceeding 50%.

Furthermore, the invention relates to a vibration isolating member which is clearly intended for assembly in a pipe clip according to the invention, and also to a roll of porous material in strip form from which vibration isolating members in strip form for a pipe clip according to the invention can be cut. This is because nowadays in practice vibration isolating members for pipe clips and rolls of material in strip form from which vibration isolating members are cut are commercially available.

BRIEF DESCRIPTION OF THE DRAWINGS

The invention will be explained in more detail below on the basis of the drawing, in which.

DETAILED DESCRIPTION OF THE PREFERRED EMBODIMENT(S) OF THE INVENTION

Figure 1A:
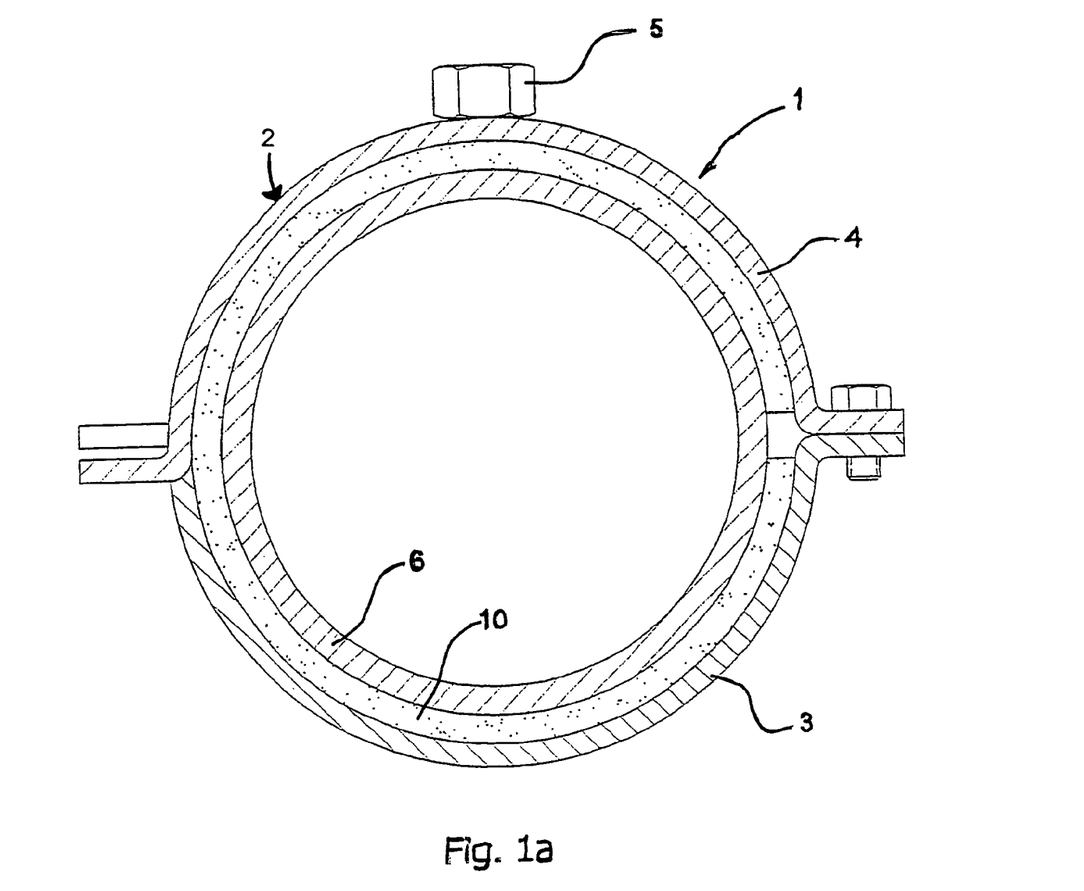
FIG. 1a shows a pipe clip provided with a vibration isolating member according to the invention, as well as a pipe supported by the pipe clip.
Figure 1B:
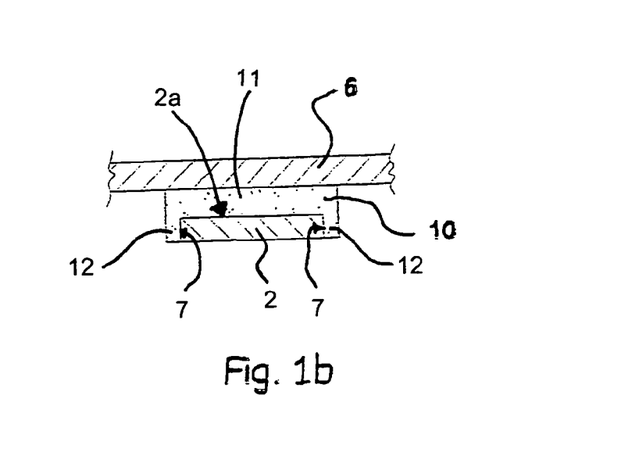
FIG. 1b shows another cross section through the pipe clip and pipe shown in FIG. 1a, FIGS. 2a-b show a cross section through an example of a vibration isolating member according to the invention in various degrees of compression.

FIGS. 1a and 1b diagrammatically depict a cross section through a vibration isolating pipe clip 1 according to the invention for securing a pipe 6 to a support, in particular for securing a medium-carrying pipe 6 to a wall or ceiling of a building.

The pipe clip 1 has a substantially rigid annular pipe clip body 2 which is composed of a first clip half 3 and a second clip half 4 and is provided with securing means, in this example nut 5, for securing the pipe clip body to a support.

It will be clear that the term annular does not mean that the pipe clip body 2 is circular in shape, for example it is also conceivable for the pipe clip body 2 to be of square or polygonal design.

Furthermore, the pipe clip 1 has a substantially annular vibration isolating member 10 which bears against the inner circumference 2a of the pipe clip body 2 and during assembly is ultimately positioned between the outer circumference of the pipe 6 and the pipe clip body 2. In this example, the vibration isolating member 10 has an elongate strip-like body 11 which extends along the inner circumference 2a of the annular pipe clip body 2.

The vibration isolating member 10 is made from a porous vulcanized rubber with closed cavities and separating walls between them.

The walls between the cavities, which are shown on an exaggerated scale in FIGS. 1a and b, have a thickness and the cavities a diameter which are such that elastic deformation of the vibration isolating member takes place under elastic deformation of these walls, with the volume of the cavities being reduced.

Furthermore, the thickness of the walls is such that in the event of elastic deformation of the vibration isolating member the intervening walls have a deformation behaviour which substantially corresponds to the deformation behaviour of solid rubber.

By way of example, the member 10 is produced by extrusion or (injection) moulding and vulcanization from a rubber selected from the group consisting of vulcanized rubbers obtained by cleaving off water from a water-containing chemical at a vulcanization temperature.

By way of example, the porous rubber is selected from the group of EPDM polymers.

By way of example, the water-containing chemical is a hydrated salt. During the vulcanization, the water then comes free dehydrating the salt and evaporating the water, resulting in the formation of the cavities and leaving the dehydrated salt in the cavities. During cooling, the water vapour condenses, so that substantially only a minimal quantity of water and vapour remains behind in the cavities. As a result, the cavities are substantially unpressurized, such that in the event of a reduction in the volume of the cavities under the influence of deformation of the vibration isolating member, no significant pressure increase occurs.

In one possible embodiment, bubbles and pockets are visible at the outer surface of the vibration isolating member 10 as a result of the production process.

The cavities have the effect that the form factor of the vibration isolating member, which is defined as the quotient of the surface area which is subject to load and the free surface area, is significantly lower than if the member 10 has a solid cross section and is even significantly lower than in known embodiments with fins/grooves and passages.

It should be noted that, the invention does of course also allow fins/grooves and internal passages of this nature also to be provided in the vibration isolating member.

It is preferable for the form factor of the vibration isolating member to be less than 0.2, more particularly less than 0.1.

It is preferable for the thickness of the intervening walls to be greater than or equal to the diameter of the cavities.

It is preferable for the diameter of the cavities to be between 0.03 and 0.7 millimeter, preferably between 0.05 and 0.5 millimeter.

In an advantageous embodiment, the number of cavities per $mm^3$ is between 75 and 350 cavities, preferably between 100 and 275 cavities.

In the embodiment shown in FIG. 1b, the body 11 of the vibration isolating member 10 is provided at its side edges with retaining edges 12 which are intended to interact in a positively locking manner with the pipe clip body 2, for example side edges 12 which extend along or engage around the side edges 7 of the annular pipe clip body 2.

These retaining edges 12 can have a less porous structure than the intervening porous strip 11, for example have a solid structure.

Further, as shown in FIG. 1b, the retaining edges 12 can be formed integrally on the intervening porous strip 11 in a co-extrusion process.

Figure 2A:
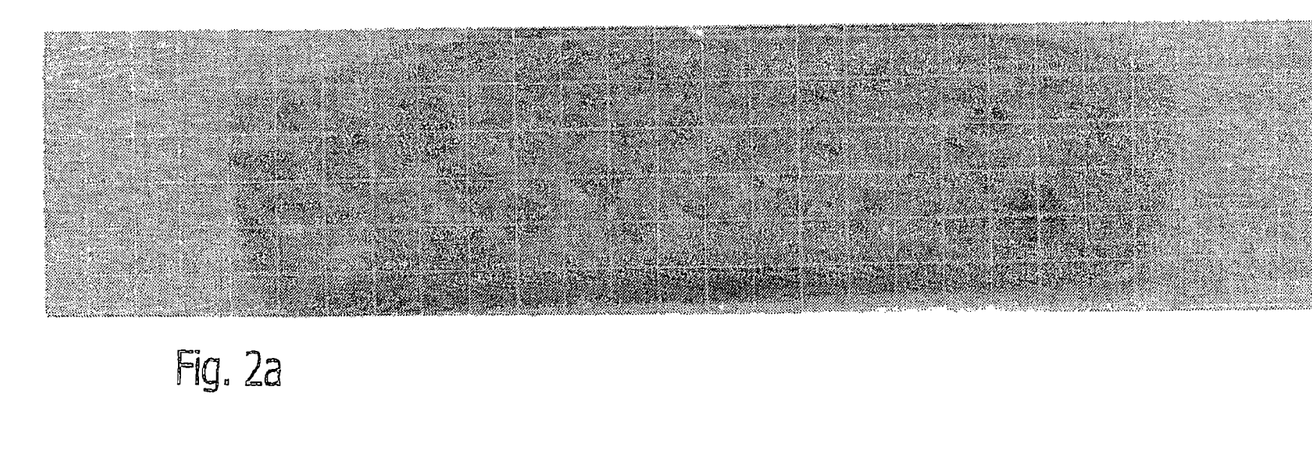
Figure 2B:
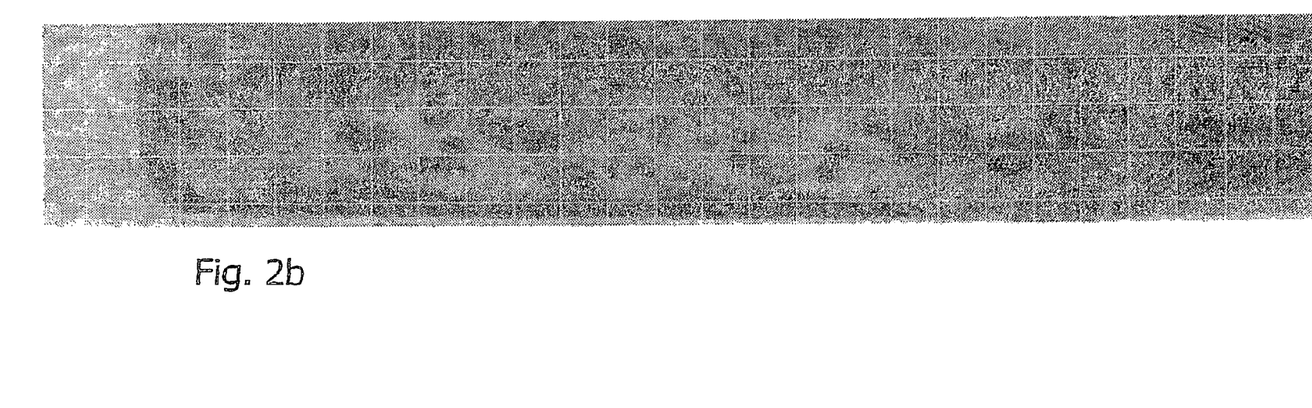

FIGS. 2a-b show, on a considerably enlarged scale, a section or a vibration isolating member of a pipe clip according to the invention in various states. This is in this case a vibration isolating member 10 which was originally rectangular in cross section, made from porous vulcanized EPDM rubber as described above. The quality of the example shown is moderate. In particular, the spread in size and distribution of the cavities is not optimal. The quality is adequate for clarification of the invention.

In FIG. 2a, the porous rubber is free from load and the cavities and intervening walls are clearly apparent.

In FIG. 2b, the porous rubber has been subject to a considerable degree of compression. It can be seen that the material of the walls behaves substantially in the same way as solid rubber, with the bulging of the rubber between the cavities taking place into the cavities, the size of which is reduced as a result.

A comparative examination relating to the vibration isolation of a pipe clip will now be explained with reference to FIGS. 3-6, representing a comparison between a known pipe clip provided with a vibration isolating member and a pipe clip provided with a vibration isolating member according to the invention.

The study was carried out by means of comparative tests performed by the Frauhofer Institut Für Bauphysik (DE). For these tests, a steel tube with an external diameter of 33 millimeters was secured to a measuring wall using pipe clips. A microphone was arranged in a receiving chamber on one side of the measuring wall, and the tube was located on the other side of the measuring wall. The measurements were carried out in accordance with DIN 52219.

The measurement results relate to differential measurements with respect to a reference test in which the pipe was secured to the measuring wall in metal pipe clips without using vibration isolating members.

Figure 3:
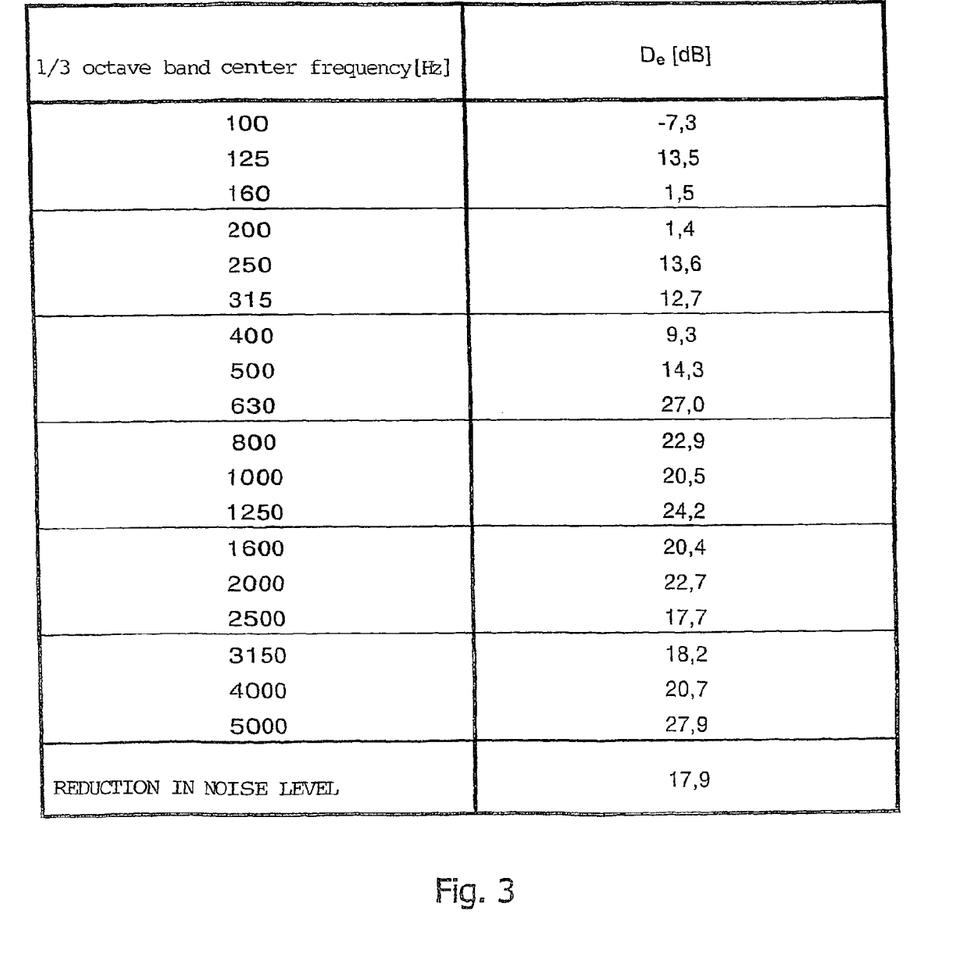
FIG. 3 shows a table presenting measurement results using a pipe clip according to the prior art.
Figure 4:
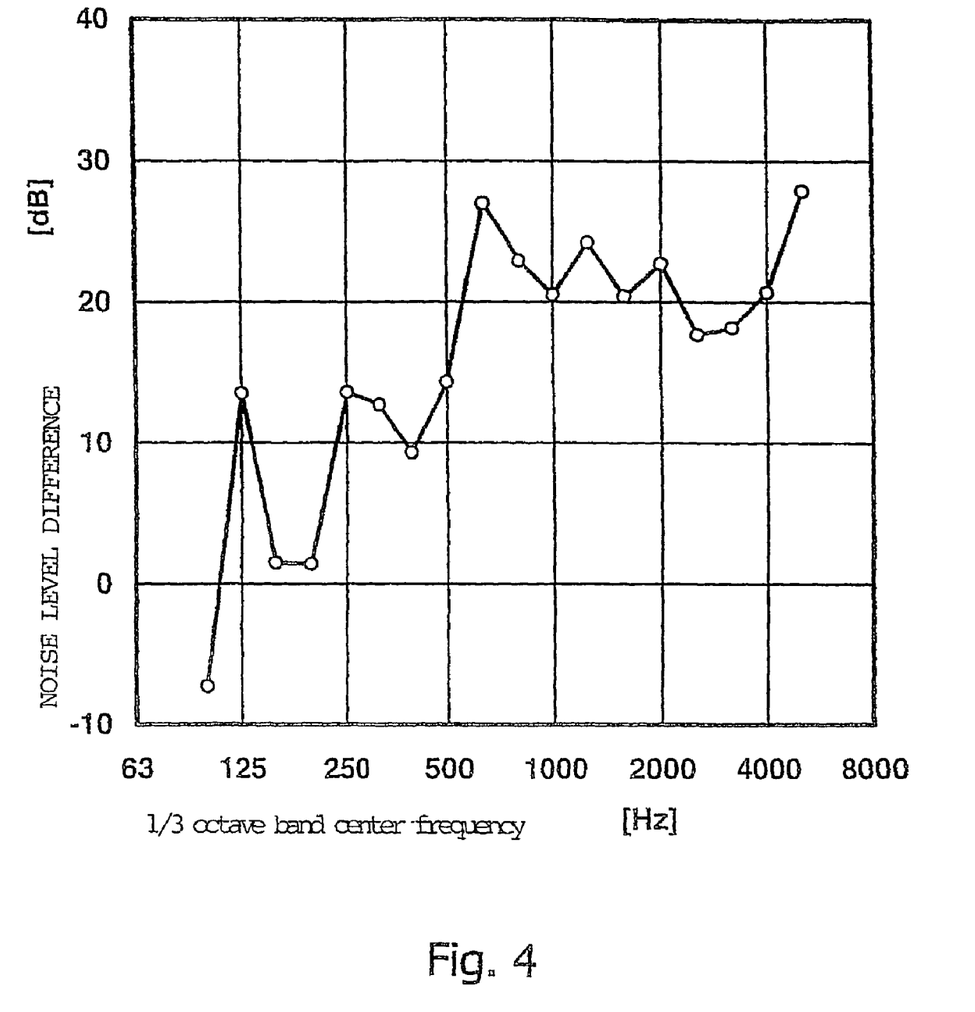
FIG. 4 shows the table from FIG. 3 in graph form.
Figure 5:
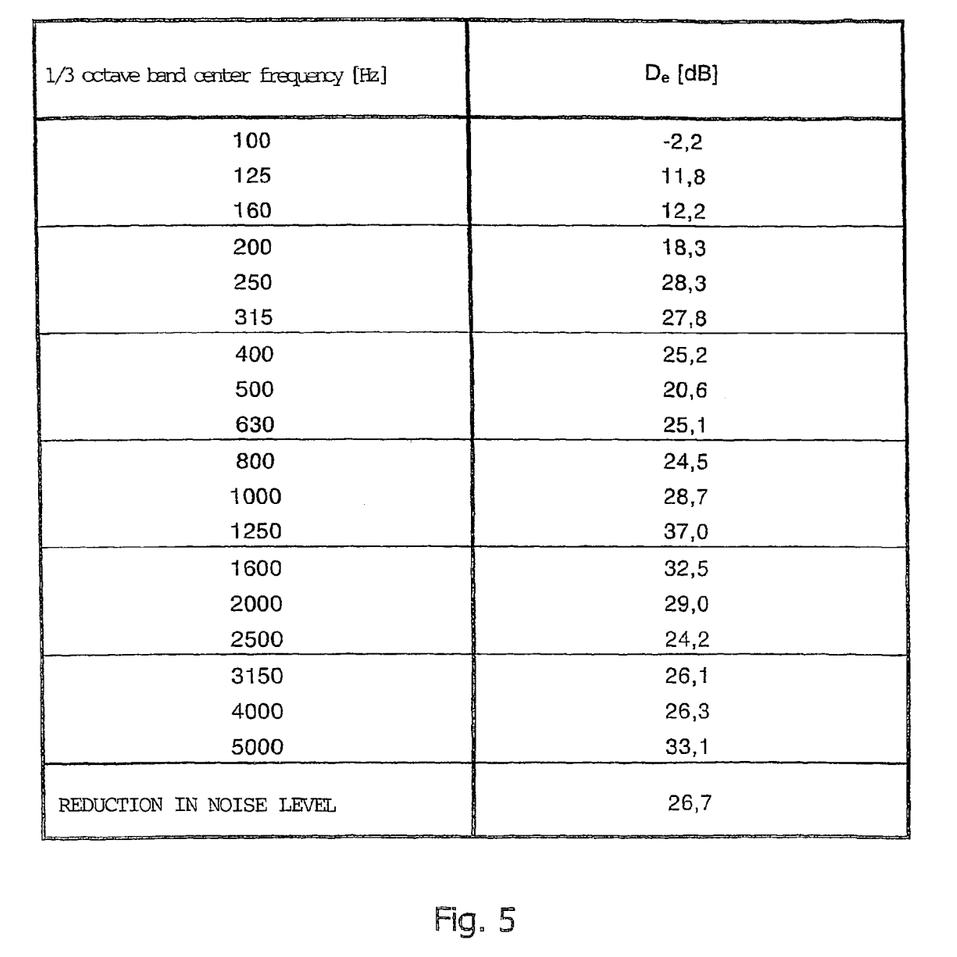
FIG. 5 shows a table presenting measurement results using a pipe clip according to the invention.
Figure 6:
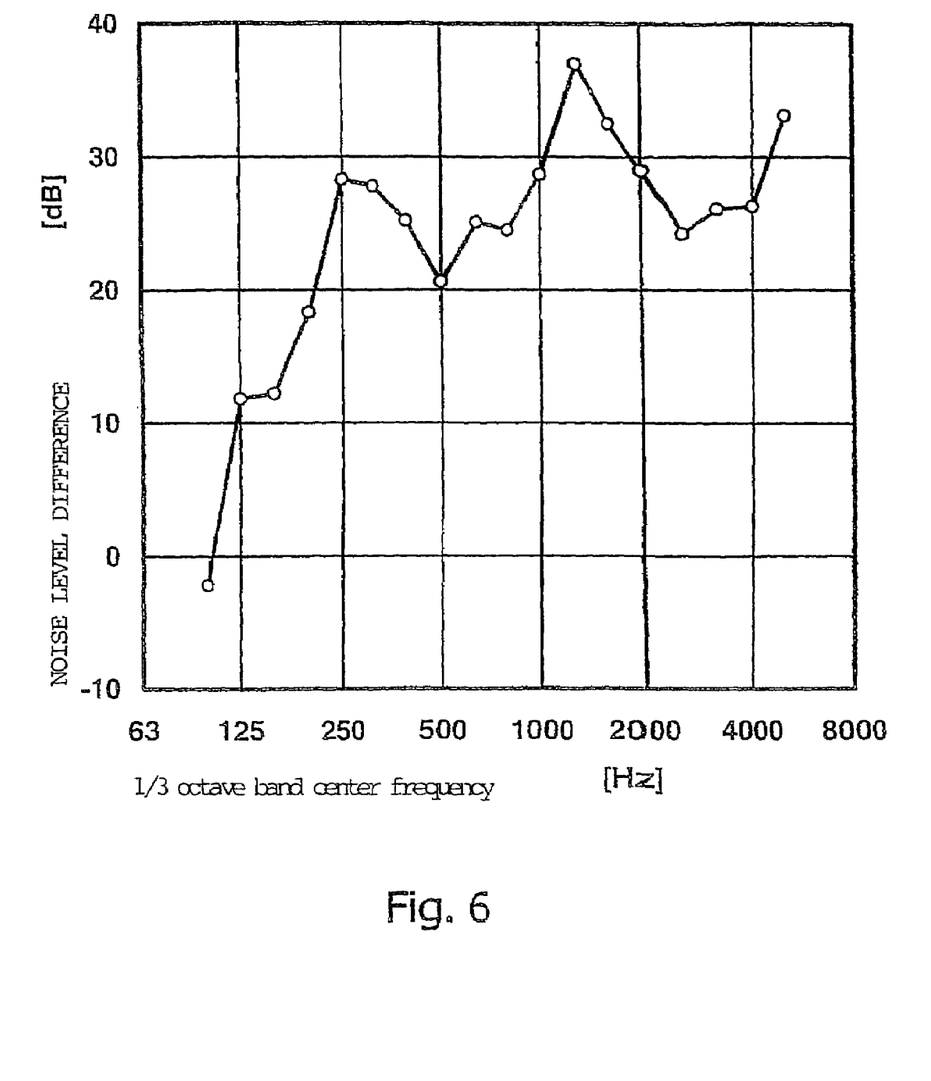
FIG. 6 shows the table from FIG. 5 in graph form.

The tables in FIGS. 3 and 5 show the measured difference in noise level (in dB) at one-third-octave band center frequencies between 100 and 5000 Hz, caused by INS (International Noise Standard) in accordance with ISO. 3822-1: 1999. Table 3 presents the results using known pipe clips of type "BISMAT 2000" as are commercially available from the present Applicant, and Table 5 presents the results using pipe clips provided with vibration isolating members according to the invention. The graph shown in FIG. 4 presents the measurement results from FIG. 3, and the graph shown in FIG. 6 presents the measurement results from FIG. 5.

It is clearly apparent from the tables and graphs that a very considerable improvement in the noise insulation is achieved in particular in the frequency range between 125 and 250 Hz using pipe clips provided with the vibration isolating member according to the invention.

The invention claimed is:

1. Vibration isolating pipe clip for securing a pipe to a support, in particular for securing a medium-carrying pipe to a wall or ceiling of a building, comprising:
    a rigid pipe clip body which is composed of one or more parts and is provided with securing means for securing the pipe clip body to a support,
    a vibration isolating member which bears against an inner circumference of the pipe clip body and is ultimately positioned between an outer circumference of the pipe and the pipe clip body under elastic deformation,
    wherein the vibration isolating member is a porous vulcanized rubber with closed cavities and separating walls between them,
    wherein the cavities are substantially unpressurized by dehydration of salt which remains in the cavities, in such a manner that in the event of a reduction in the volume of the cavities under the influence of deformation of the vibration isolating member, no significant pressure increase occurs inside the cavities,
    wherein the vibration isolating member has a form factor defined by the quotient of the surface area which is subject to load and the free surface area, and in which the cavities significantly reduce the form factor, and
    wherein the form factor of the vibration isolating member is less than 0.2.

2. Vibration isolating pipe clip for securing a pipe to a support, in particular for securing a medium-carrying pipe to a wall or ceiling of a building, comprising:
    a rigid pipe clip body which is composed of one or more parts and is provided with securing means for securing the pipe clip body to a support,
    a vibration isolating member which bears against an inner circumference of the pipe clip body and is ultimately positioned between an outer circumference of the pipe and the pipe clip body under elastic deformation,
    wherein the vibration isolating member is a porous vulcanized rubber with closed substantially unpressurized cavities and separating walls between them having a chemical from which water has been cleaved,
    wherein the unpressurized cavities when reduced in volume by deformation of the vibration isolating member, produce no significant pressure increase inside the cavities.

3. The vibration isolating pipe clip for securing a pipe to a support according to claim 2, wherein the chemical from which water has been cleaved is a salt.

4. The vibration isolating pipe clip for securing a pipe to a support according to claim 3, wherein the vibration isolating member has a form factor defined by the quotient of the surface area which is subject to load and the free surface area, and in which the cavities significantly reduce the form factor.

5. The vibration isolating pipe clip for securing a pipe to a support according to claim 4, wherein the form factor of the vibration isolating member is less than 0.2.

6. The vibration isolating pipe clip for securing a pipe to a support, in particular for securing a medium-carrying pipe to a wall or ceiling of a building, comprising:
- a rigid pipe clip body which is composed of one or more parts and is provided with securing means for securing the pipe clip body to a support,
- a vibration isolating member which bears against an inner circumference of the pipe clip body and is ultimately positioned between an outer circumference of the pipe and the pipe clip body under elastic deformation,
- wherein the vibration isolating member is a porous vulcanized rubber with closed cavities and separating walls between them, and
- wherein the cavities are substantially unpressurized by dehydration of salt which remains in the cavities, in such a manner that in the event of a reduction in the volume of the cavities under the influence of deformation of the vibration isolating member, no significant pressure increase occurs inside the cavities.

7. The vibration isolating pipe clip of claim 1 wherein the closed cavities of the vibration isolating member have an average diameter between 0.03 and 0.7 mm, the number of cavities per $mm^3$ is between 75 and 350, and wherein the separating walls of the closed cavities have a thickness greater than or equal to the diameter of the cavities.

8. The vibration isolating pipe clip of claim 1 wherein the closed cavities of the vibration isolating member have an average diameter between 0.05 and 0.5 mm, the number of cavities per $mm^3$ is between 100 and 275, and wherein the separating walls of the closed cavities have a thickness greater than or equal to the diameter of the cavities.

9. The vibration isolating pipe clip of claim 1 wherein the form factor of the vibration isolating member is less than 0.1.

10. The vibration isolating pipe clip according to claim 1 wherein the vulcanized rubber with closed cavities and separating walls comprises an EPDM polymer.

* * * * *